(12) United States Patent
Yamamoto (10) Patent No.: US 10,005,166 B2
(45) Date of Patent: Jun. 26, 2018

(54) TOOL CHANGER

(71) Applicant: FANUC CORPORATION, Yamanashi (JP)

(72) Inventor: Yasuyuki Yamamoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days. days.

(21) Appl. No.: 15/446,466

(22) Filed: Mar. 1, 2017

(65) Prior Publication Data

US 2017/0259388 A1    Sep. 14, 2017

(30) Foreign Application Priority Data

Mar. 8, 2016   (JP) .................................. 2016-044091

(51) Int. Cl.
   *B23Q 16/02*      (2006.01)
   *B23Q 15/26*      (2006.01)
   (Continued)

(52) U.S. Cl.
   CPC ............ *B23Q 16/06* (2013.01); *B23Q 15/26* (2013.01); *B23Q 16/065* (2013.01);
   (Continued)

(58) Field of Classification Search
   CPC ........................ Y10T 29/5152–29/5167; Y10T 82/2506–82/2508; Y10T 82/2587; Y10T 408/37; Y10T 74/14–74/1494; B23B 3/16–3/168; B23B 29/24–29/34; B23B 39/20–39/205; B23Q 2039/004; B23Q 2220/002; B23Q 2716/02
   (Continued)

(56) References Cited

U.S. PATENT DOCUMENTS

| 4,494,206 A  * | 1/1985 | Imazeki ................. B23Q 16/02 |
| | | 318/601 |
| 9,533,391 B2 * | 1/2017 | Murota .............. B23Q 3/15526 |
| 2015/0209924 A1 | 7/2015 | Murota et al. |

FOREIGN PATENT DOCUMENTS

| JP | 62-259939 A | * 11/1987 |
| JP | H10286743 A | 10/1998 |
| JP | 2015139842 A | 8/2015 |

OTHER PUBLICATIONS

Machine Translation JP 10-286743 A, which JP '743 was published Oct. 27, 1998.*

(Continued)

*Primary Examiner* — Erica E Cadugan
(74) *Attorney, Agent, or Firm* — Hauptman Ham, LLP (57) ABSTRACT

In order to provide a tool changer that can detect an entry of a foreign substance into a turret mechanism portion or wear of a turret mechanism part, a tool changer of the present invention includes a reference phase false detection sensing portion that monitors load variations which occur in a turret drive source and detects an entry of a foreign substance into the turret mechanism portion based on a difference between the load variations and a reference load used as a reference. Moreover, the reference phase false detection sensing portion can also detect the progress of wear of the turret mechanism part based on the integral of the absolute value of a difference between the load variations which occur in the turret drive source and the reference load used as a reference.

2 Claims, 11 Drawing Sheets

(51) Int. Cl.
  *B23B 29/32* (2006.01)
  *G05B 19/18* (2006.01)
  *B23Q 16/06* (2006.01)
  *B23Q 17/00* (2006.01)
(52) U.S. Cl.
  CPC ...... *B23Q 17/007* (2013.01); *B23Q 2220/002* (2013.01); *B23Q 2716/02* (2013.01); *G05B 2219/45141* (2013.01); *G05B 2219/50047* (2013.01); *Y10T 29/5154* (2015.01); *Y10T 29/5165* (2015.01); *Y10T 74/1406* (2015.01); *Y10T 74/1488* (2015.01)
(58) Field of Classification Search
  USPC .................. 74/813 C, 814, 813 R–813 L; 29/35.5–48.5 A; 82/120–121, 159; 408/35
  See application file for complete search history.

(56) References Cited

OTHER PUBLICATIONS

Japanese Office Action dated Mar. 6, 2018 for Japanese Application No. 2016-044091; 8 pp.

\* cited by examiner

TOOL CHANGER

RELATED APPLICATIONS

The present application claims priority to Japanese Patent Application Number 2016-044091 filed Mar. 8, 2016, the disclosure of which is hereby incorporated by reference herein in its entirety.

BACKGROUND OF THE INVENTION

1. Field of the Invention

The present invention relates to tool changers and, in particular, to a tool changer of a machine tool that performs tool indexing by turning of a turret.

2. Description of the Related Art

A tool changer that automatically changes a tool which is attached to a main axis of a machine tool has been used. In this tool changer, a plurality of tools necessary for work are set in advance, and the tool changer is configured so as to automatically change a tool which is attached to the main axis of the machine tool to a designated tool in accordance with the process of machining.

In a machine tool provided with the existing tool changer, a controller of the machine tool generally recognizes only the position or phase of a turret drive source and does not directly recognize the actual position of a turret. As a result, if a difference is caused between the turret phase which is recognized by the controller of the machine tool and the actual turret phase, tool change cannot be performed normally. This makes it necessary for work to eliminate the difference.

In order to solve the above problem, the technique disclosed in Japanese Patent Application Laid-Open No. 2015-139842 implements a machine tool having the function of automatically conducting work which eliminates the difference by detecting variations in a load which periodically occur by turning of a turret and setting a reference phase for turret indexing based on the detection result.

However, the method disclosed in Japanese Patent Application Laid-Open No. 2015-139842 has a problem of false detection of a reference phase, that is, if the positions in which load variations, which periodically occur at the time of turning of the turret, occur change by an entry of a foreign substance into a mechanism portion which performs turret indexing, a reference phase is set based on the changed load variations. Moreover, the method also has a problem of the difficulty of detecting a reference phase if load variations, which periodically occur at the time of turning of the turret, become smaller by the occurrence of wear in a turret mechanism part.

SUMMARY OF THE INVENTION

An object of the present invention is accordingly to provide a tool changer that can detect an entry of a foreign substance into a turret mechanism portion or wear in a turret mechanism part.

A tool changer of a machine tool according to the present invention performs tool indexing by turning a turret by a transfer mechanism that transfers an output of a turret drive source and includes: a load variation mechanism that varies a load of the turret drive source in a predetermined phase during turning of the turret; a load detecting portion of the turret drive source, the load detecting portion detecting the load of the turret drive source which is varied by the load variation mechanism; a turret turning motion reference load storing portion that stores the load of the turret drive source during turret turning motion in a state in which no difference is caused between the phase of the turret which is recognized by a controller of the machine tool and the actual phase of the turret; a difference calculation portion that calculates a difference between the detected load and a stored reference load; a threshold value setting portion that sets a threshold value; and a reference phase false detection sensing portion that determines a possibility of false detection of a reference phase if the difference calculated by the difference calculation portion has exceeded the threshold value.

A tool changer of a machine tool according to the present invention performs tool indexing by turning a turret by a transfer mechanism that transfers an output of a turret drive source and includes: a load variation mechanism that varies a load of the turret drive source in a predetermined phase during turning of the turret; a load detecting portion of the turret drive source, the load detecting portion detecting the load of the turret drive source which is varied by the load variation mechanism; a turret turning motion reference load storing portion that stores the load of the turret drive source during turret turning motion in a state in which no difference is caused between the phase of the turret which is recognized by a controller of the machine tool and the actual phase of the turret; a difference calculation portion that calculates a difference between the detected load and a stored reference load; an integral-of-difference calculation portion that evaluates the integral of the value of the difference; a threshold value setting portion that sets a threshold value; and a reference phase false detection sensing portion that determines a possibility of false detection of a reference phase if the integral evaluated by the integral-of-difference calculation portion has exceeded the threshold value.

According to the present invention, since the value of a difference (=the detected value of variations−the value of variations in normal times) varies greatly if a foreign substance enters a turret indexing mechanism portion, it is possible to determine that a foreign substance has entered the turret mechanism portion if it is sensed that the difference value has exceeded the threshold value, and, by not setting the reference phase based on the variations detected after the above determination and stopping the tool change operation, it is possible to prevent false detection of a reference phase.

Moreover, when wear of the turret mechanism part progresses, the way the load varies at the time of tool change changes, which sometimes makes it impossible to detect the reference phase based on the variations. However, by evaluating the integral of the difference value and sensing that the integral has exceeded the threshold value set for the integral, it is possible to sense that wear of the turret mechanism part is progressing and, by not setting the reference phase based on the variations detected after the above sensing and stopping the tool change operation, it is possible to prevent false detection of a reference phase.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENT

Hereinafter, an embodiment of the present invention will be described with reference to the drawings.

A tool changer of the present invention is provided with a mechanism in which variations in a load occur in a predetermined phase at the time of turning of a turret and is capable of detecting a state in which variations in the load are different from the variations in normal times. If variations in the load are different from the variations in normal times, the tool changer prevents false detection of a reference phase by stopping tool change operation or generating an alarm without performing phase setting processing based on the detected variations in the load.

In a first detection method, which is carried out by the tool changer of the present invention, of detecting load variations different from the variations in the load in normal times, the tool changer is provided with the function of storing variations in normal times, the function of calculating a difference between the variations detected at the time of tool change and the stored variations, the function of being capable of setting a threshold value for the difference value, and the function of being capable of sensing that the difference value has exceeded the threshold value and detects, for example, an entry of a foreign substance into a turret indexing mechanism portion by these functions.

In a second detection method, which is carried out by the tool changer of the present invention, of detecting load variations different from the variations in the load in normal times, the tool changer is provided with the function of storing variations in normal times, the operation function of evaluating the integral of the absolute value of a difference between the variations detected at the time of tool change and the stored variations, the function of being capable of setting a threshold value for the integral, and the function of being capable of sensing that the integral has exceeded the threshold value and detects, for example, wear of a turret mechanism part by these functions.

<A Load Variation Mechanism and a Load Detecting Portion at the Time of Turning of a Turret>

Figure 1A:
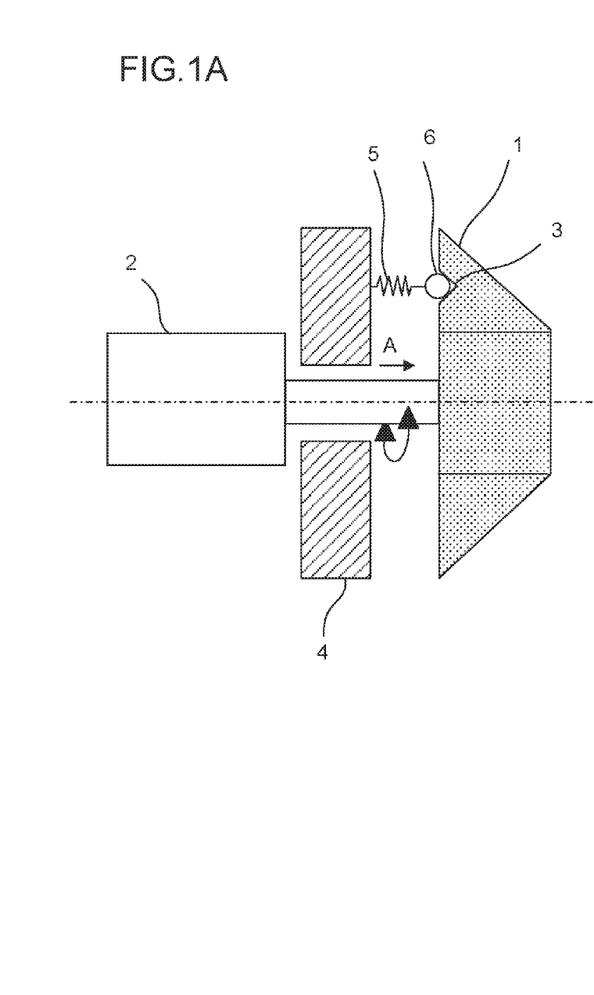
FIG. 1A is a diagram depicting the relationship between a turret drive source and a turret of a tool changer according to one embodiment of the present invention.
Figure 1B:
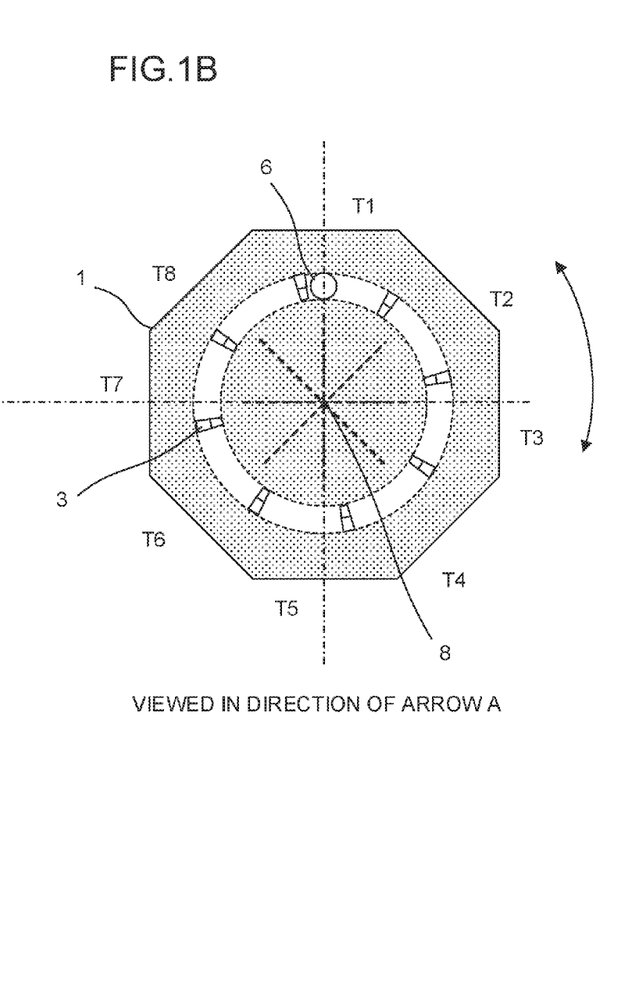
FIG. 1B is a diagram of the turret viewed from the side of the turret drive source in the direction of an arrow A.

FIGS. 1A and 1B are diagrams depicting the relationship between a turret drive source and a turret of a tool changer according to one embodiment of the present invention; FIG. 1A being a side view and FIG. 1B being a diagram of the turret viewed from the side of the turret drive source in the direction of an arrow A. In FIGS. 1A and 1B, 1 denotes a turret and 2 denotes a turret drive source that drives the turret 1, and the turret drive source 2 is connected to the turret 1 via a transfer mechanism with a fixed portion 4 being placed therebetween. The turret 1 can turn in both right and left directions about a center 8 of turning, and T1, T2, T3, . . . represent phases in which a tool can be transferred between a main axis and the turret 1.

On a surface of the turret 1 located on the side where the turret drive source 2 is located, a ball 6 is pressed against the turret 1 by a spring 5 whose end is fixed to the fixed portion 4, and, as a result of the turret 1 turning, the ball 6 presses any position in an area of the turret 1 surrounded by dotted lines between two circumferences, of which one is smaller or larger than the other. Moreover, in a circular path on the turret 1 on which the ball 6 moves, grooves 3 are provided such that, for example, the path is divided into equal parts (eight parts in FIG. 1B) whose number is equal to the number of phases in which a tool can be transferred between the main axis and the turret 1.

When the turning motion of the turret 1 is produced by the power of the turret drive source 2, the ball 6 moves on the circular path while pressing the turret 1 and, in so doing, passes over the grooves 3. When the ball 6 passes through spots other than the grooves 3, a fixed load is applied to the turret drive source 2 by the frictional force acting between the ball 6 and the turret 1.

When the ball 6 passes over the groove 3, the ball 6 first enters the groove 3 and the spring 5 changes so as to stretch. When the ball 6 lies on the groove 3, the ball 6 moves to fit the shape of the groove 3 and the spring 5 changes so as to stretch, and the spring 5 then changes so as to compress. When the ball 6 moves out of the groove 3, the spring 5 changes so as to compress. In this series of movements, when the spring 5 stretches, the ball 6 exerts a force on the turret 1 in the same direction as the turning direction of the turret 1, and the load which is applied to the turret drive source 2 is reduced. In contrast to this, when the spring 5 compresses, since a force to compress the spring 5 is applied to the spring 5 from the turret 1 via the ball 6, a reactive force is exerted in a direction which becomes resistance to the turning of the turret 1. Therefore, the load which is applied to the turret drive source 2 is increased.

Figure 2:
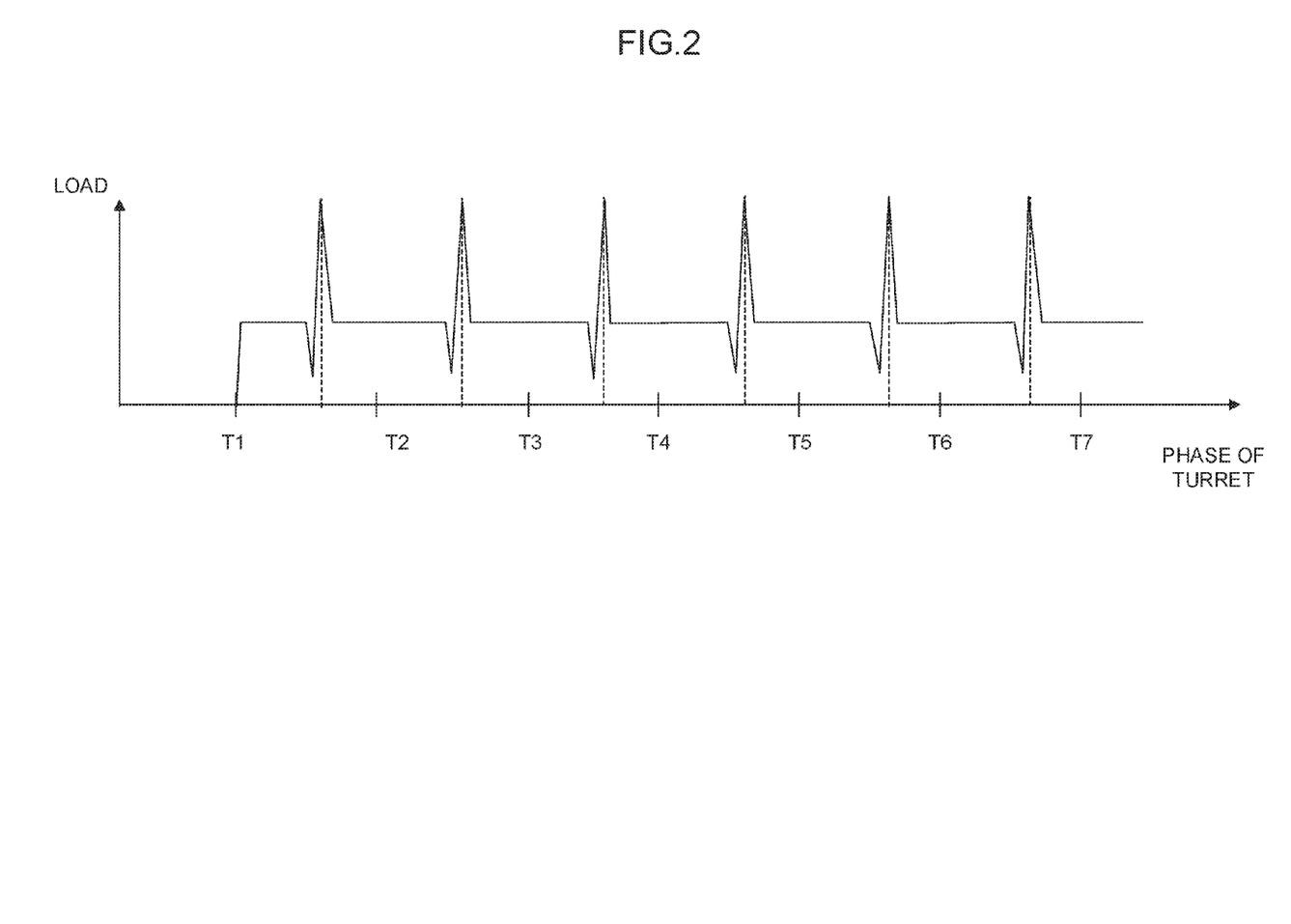
FIG. 2 is a diagram depicting variations in a load of the turret drive source when the turret is turned by the turret drive source of FIG. 1A.

As a result, when the turret 1 is turned by the turret drive source 2, as depicted in FIG. 2, the load of the turret drive source 2 varies in the positions in which the ball 6 lies on the grooves 3. By detecting the variations in the load of the turret drive source 2, it is possible to detect the actual position of the turret 1.

Next, a method of detecting the load of the turret drive source 2 by a mechanism that varies the load of the turret drive source 2 will be described.

The power to be output from the turret drive source 2 is controlled by a controller of a machine tool such that the turret drive source 2 turns the turret 1 at a designated speed which is set in the controller of the machine tool in advance. For example, by performing control to increase output if the turret 1 turns at a speed slower than the designated speed and lower output if the turret 1 turns at a speed faster than the designated speed, the controller performs control such that the turning speed of the turret 1 becomes the designated speed. As a result, if resistance to the turning motion of the turret 1 is reduced, the output of the turret drive source 2 is reduced; if resistance to the turning motion of the turret 1 is increased, the output of the turret drive source 2 is increased.

In the case of the mechanism depicted in FIGS. 1A and 1B, since the load which is applied to the turret drive source 2 during the turning motion of the turret 1 varies as a result of the ball 6 entering and moving out of the grooves 3 by the turning motion of the turret 1, a command value to the turret drive source 2 from the controller of the machine tool changes in accordance with the variations and a current value to be supplied to the turret drive source 2 also changes. By detecting changes in this command value or the current value which is input to the turret drive source 2, it is possible to detect the variations in the load which is applied to the turret drive source 2, the variations caused by the grooves 3.
<First Load Variation Detection Method>

Hereinafter, a first load variation detection method will be described.

Figure 3:
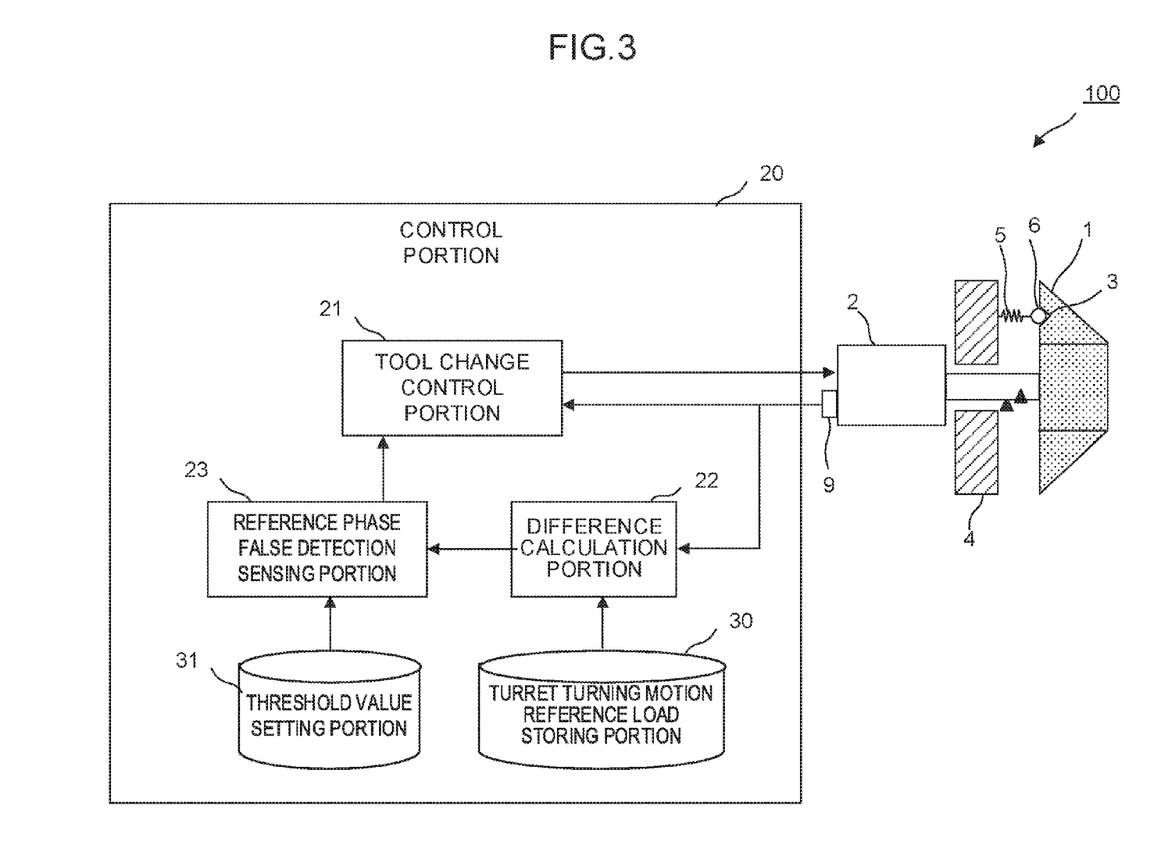
FIG. 3 is a schematic block diagram depicting a function of a control portion of the tool changer in accordance with a first load variation detection method of the present invention.

FIG. 3 is a schematic block diagram depicting a function of a control portion of the tool changer according to one embodiment of the present invention. Driving of the turret drive source 2 of a tool changer 100 of the present embodiment is controlled by a control portion 20. Moreover, the control portion 20 includes a tool change control portion 21, a difference calculation portion 22, a reference phase false detection sensing portion 23, a turret turning motion reference load storing portion 30, and a threshold value setting portion 31.

The tool change control portion 21 controls tool change based on a command by a block of a program which is read from unillustrated memory and executed or a command by a signal. In tool change control, the tool change control portion 21 controls the turret drive source 2 such that the turret drive source 2 turns the turret 1 based on a difference between the phase of the turret 1 which is recognized on the side of the control portion 20 and the phase of the turret 1 in which a tool to be changed can be changed. Moreover, the tool change control portion 21 performs control by which variations in the load of the turret drive source 2 are detected based on the load detected by a load detecting portion 9 provided in the turret drive source 2 and a difference between the phase of the turret 1 and the phase of the turret drive source 2 is adjusted or corrected based on the detected result. The control method of the turret drive source 2 which is carried out by the tool change control portion 21 is the same as the control method disclosed in Japanese Patent Application Laid-Open No. 2015-139842.

The difference calculation portion 22 obtains the load of the turret drive source 2 detected by the load detecting portion 9 when the tool change control portion 21 is controlling driving of the turret drive source 2 and the turret 1 is producing turning motion, calculates a difference between the load thus obtained and a reference load stored in the turret turning motion reference load storing portion 30, and outputs the difference to the reference phase false detection sensing portion 23. The reference load stored in the turret turning motion reference load storing portion 30 is the measured load of the turret drive source 2 during turret turning motion in a state in which there is no difference between the phase of the turret 1 which is recognized by the control portion 20 and the actual phase of the turret 1. The reference load is measured for each of the turning directions (the clockwise and counterclockwise directions) of the turret drive source 2 and is stored in the turret turning motion reference load storing portion 30 in such a way that the reference load in one turning direction can be differentiated from the reference load in the other turning direction. The difference calculation portion 22 uses any one of the reference loads stored in the turret turning motion reference load storing portion 30 in accordance with the turning direction of the turret drive source 2.

Figure 4:
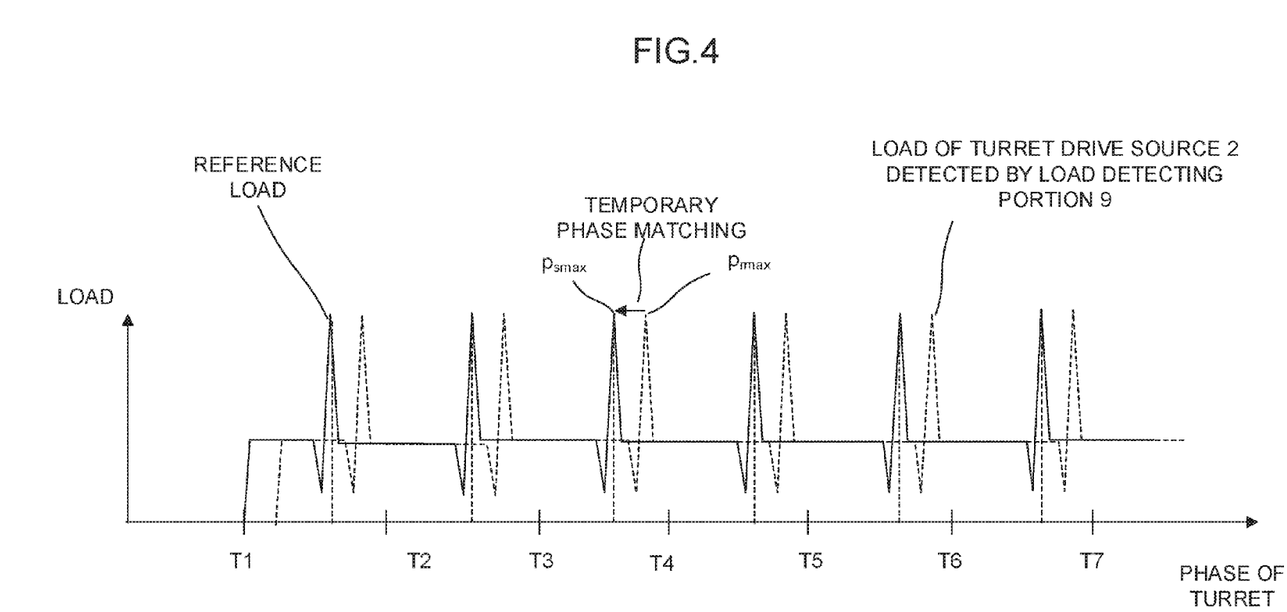
FIG. 4 is a diagram explaining temporary phase matching processing which is performed by using a reference load.

When calculating a difference between the load of the turret drive source 2 detected by the load detecting portion 9 and the reference load, the difference calculation portion 22 first performs "temporary phase matching" processing between the load of the turret drive source 2 detected by the load detecting portion 9 and the reference load. As an example of the "temporary phase matching" processing, as depicted in FIG. 4, processing may be performed such that a phase $p_{rmax}$ indicating the maximum value of the load of the turret drive source 2 detected by the load detecting portion 9 is chosen and the phase of the entire load of the turret drive source 2 detected by the load detecting portion 9 is shifted so that the phase $p_{rmax}$ becomes the same phase as a phase $p_{smax}$ indicating the maximum value of the reference load closest to the phase $p_{rmax}$. As another example of the "temporary phase matching" processing, processing may be performed such that the phase of the entire load of the turret drive source 2 detected by the load detecting portion 9 is shifted so that the total value (the integral) of differences, each being a difference between the load of the turret drive source 2 detected by the load detecting portion 9 and the reference load in each phase, is minimized.

After performing the above-described "temporary phase matching" processing, the difference calculation portion 22 calculates a difference between the load of the turret drive source 2 detected by the load detecting portion 9 and the reference load in each phase and outputs the results to the reference phase false detection sensing portion 23. Incidentally, as for the load at the time of acceleration immediately after the start of the turning of the turret drive source 2 and the load at the time of deceleration immediately before the stop of the turning of the turret drive source 2, the difference calculation portion 22 does not calculate a difference between each of these loads and the reference load. This makes it possible to prevent false detection of a foreign substance or the like based on unstable load variations at the time of acceleration and deceleration.

The reference phase false detection sensing portion 23 receives the difference between the load of the turret drive source 2 detected by the load detecting portion 9 and the reference load in each phase, the difference output from the difference calculation portion 22, and compares, in each phase, the difference with a threshold value $Th_d$ which is set in the threshold value setting portion 31. Then, if the difference between the load of the turret drive source 2 detected by the load detecting portion 9 and the reference load has exceeded the threshold value $Th_d$ in any phase, the reference phase false detection sensing portion 23 determines that there is a possibility that the tool change control portion 21 falsely detects a reference phase and issues, to the tool change control portion 21, a command not to correct or adjust the reference phase and a command to stop the tool change control. At this time, the reference phase false detection sensing portion 23 may inform the operator of the possibility of false detection of a reference phase by providing a notification to that effect to an unillustrated display device or alarm device.

Figure 5A:
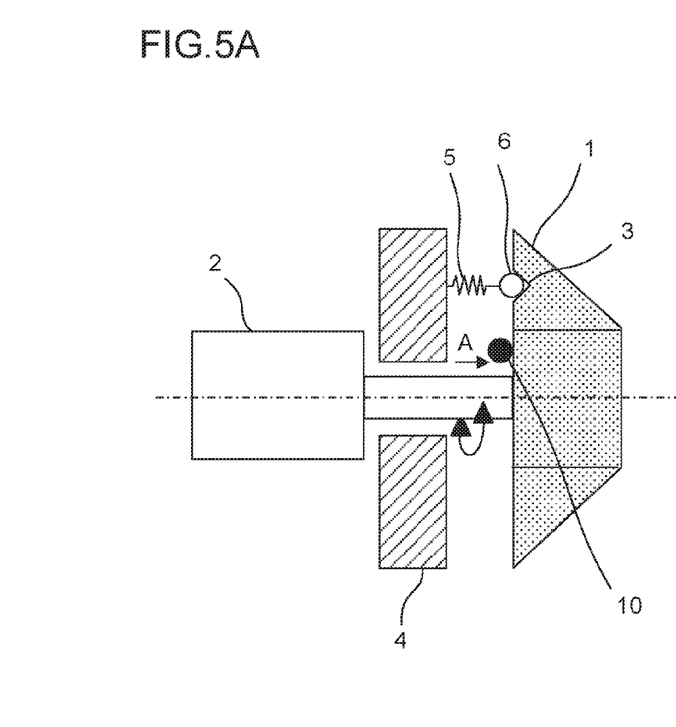
FIG. 5A is a diagram explaining the first load variation detection method and is a side view of the turret drive source and the turret.
Figure 5B:
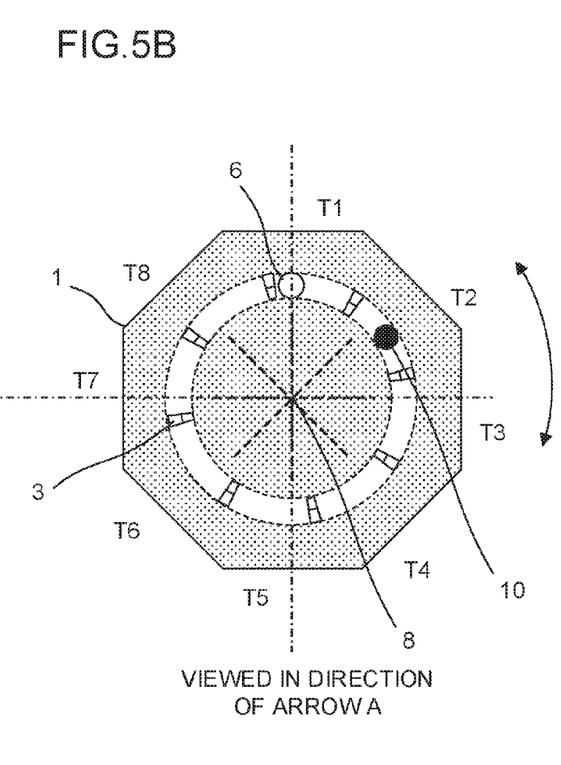
FIG. 5B is a diagram of the turret of FIG. 5A viewed from the side of the turret drive source in the direction of an arrow A.
Figure 6A:
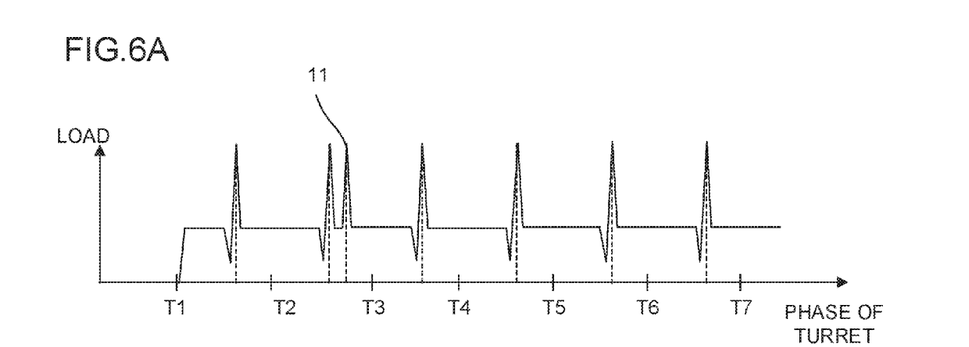
FIG. 6A is a diagram depicting variations in the load which occur in the turret drive source and the difference value of the load in the first load variation detection method (a case where a foreign substance enters a turret mechanism portion)

FIGS. 5A and 5B depict an example of a state in which a foreign substance enters a turret indexing mechanism portion. Moreover, FIG. 6A depicts variations in the load of the turret drive source 2 which are detected in the state depicted in FIGS. 5A and 5B.

When the turret 1 turns and the ball 6 moves in an area of the turret 1 surrounded by dotted lines between two circumferences, of which one is smaller or larger than the other, while pressing the turret 1, if a foreign substance 10 that has entered a turret mechanism portion as depicted in FIGS. 5A and 5B is caught between the ball 6 and the area of the turret 1 surrounded by dotted lines between two circumferences, of which one is smaller or larger than the other, the foreign substance 10 acts so as to push the spring 5 and thereby generates a force in a direction which becomes resistance to the turning of the turret 1 by the turret drive source 2. As a result, as depicted in FIG. 6A, load variation 11 caused by the foreign substance 10 that has entered the turret mechanism portion develops in the load of the turret drive source 2 detected by the load detecting portion 9. If this is detected as the phase of an indexing reference, the phase of the load variation 11 caused by the foreign substance 10 that has entered the turret mechanism portion is falsely detected as the phase of the indexing reference of the turret 1.

Figure 6B:
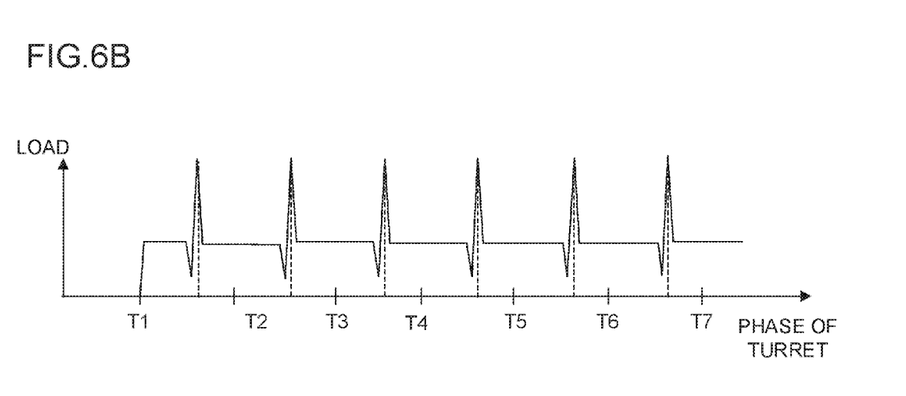
FIG. 6B is a diagram depicting variations in the load which occur in the turret drive source and the difference value of the load in the first load variation detection method (a case where no foreign substance enters the turret mechanism portion)
Figure 6C:
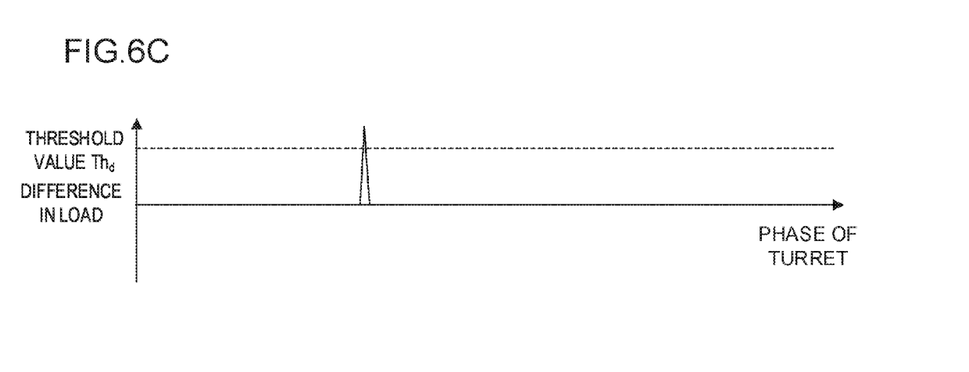
FIG. 6C is a diagram depicting the relationship among variations in the load which occur in the turret drive source, the difference value of the load, and a threshold value $Th_d$ in the first load variation detection method.

FIG. 6B depicts the reference load indicating how the load of the turret drive source 2 varies in normal times. Moreover, FIG. 6C depicts a difference between the load of the turret drive source 2 detected by the load detecting portion 9 and the reference load, the difference calculated by the difference calculation portion 22. As depicted in FIG. 6C, if the difference has exceeded the threshold value $Th_d$, by sensing this, it is possible to detect an entry of a foreign substance into the turret mechanism portion and, by keeping the reference phase from being corrected or adjusted, it is possible to prevent false detection of a reference phase.

Figure 7:
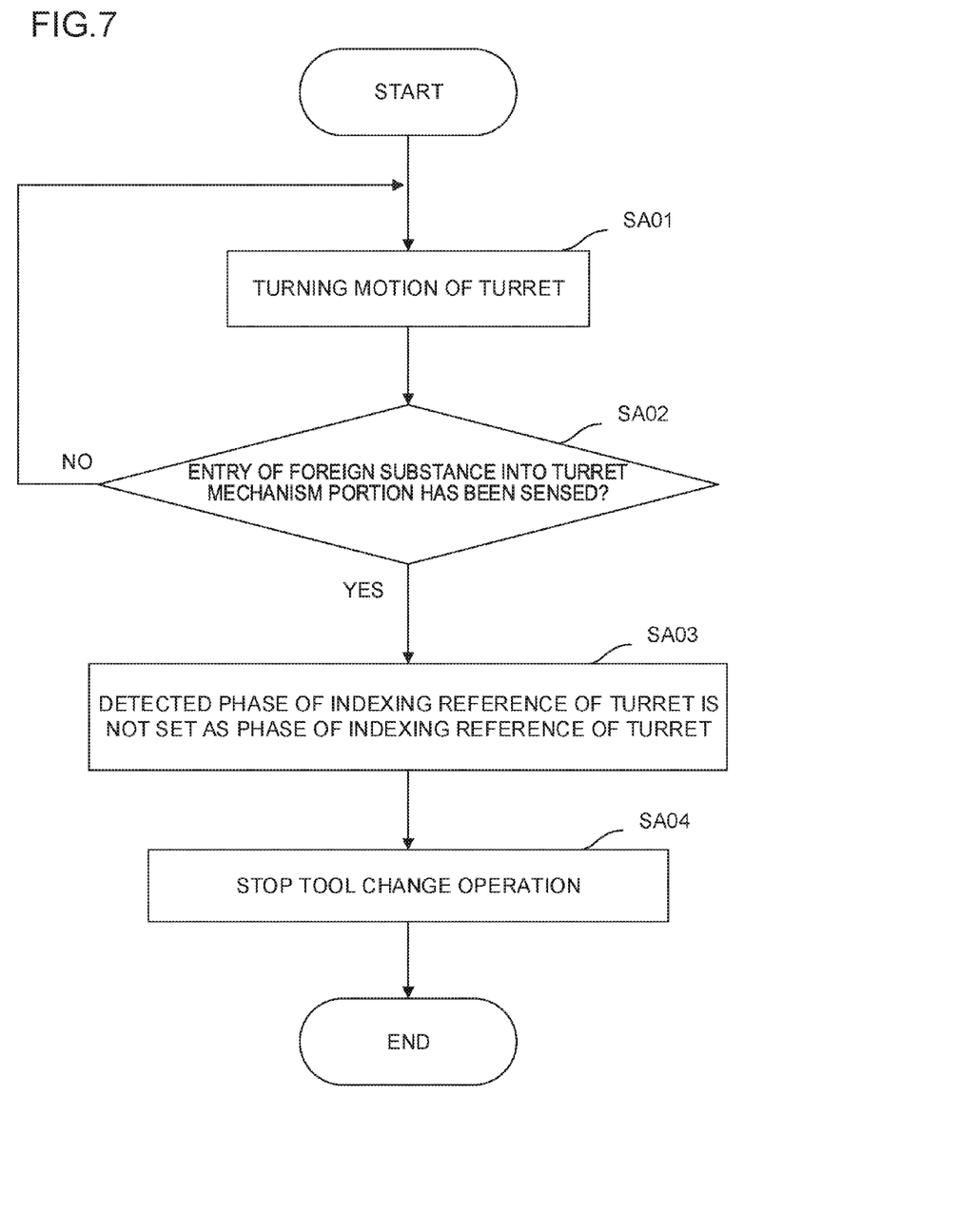
FIG. 7 is a flowchart of the first load variation detection method which is carried out in the control portion of the tool changer of FIG. 3.

FIG. 7 is a flowchart of tool change control processing according to the present embodiment.

[Step SA01] The tool change control portion 21 performs control of turning motion of the turret 1 based on a command.

[Step SA02] The reference phase false detection sensing portion 23 determines whether or not the reference phase false detection sensing portion 23 has sensed an entry of a foreign substance into the turret mechanism portion based on a difference between the load at the time of turning and the reference load, the difference calculated by the difference calculation portion 22. If the reference phase false detection sensing portion 23 has sensed an entry of a foreign substance, the procedure proceeds to Step SA03; if the reference phase false detection sensing portion 23 has not sensed an entry of a foreign substance, the procedure goes back to Step SA01.

[Step SA03] The reference phase false detection sensing portion 23 issues, to the tool change control portion 21, a command not to set the detected indexing reference phase of the turret 1 as the phase of the indexing reference of the turret 1.

[Step SA04] The tool change control portion 21 performs control to stop the tool change operation.

As described above, since the value of a difference (=the detected value of variations−the value of variations in normal times) varies greatly if a foreign substance enters the turret indexing mechanism portion, the above-described configuration makes it possible to determine that a foreign substance has entered the turret mechanism portion if it is sensed that the difference value has exceeded the threshold value, and, by not setting the reference phase based on the variations detected after the above determination and stopping the tool change operation, it is possible to prevent false detection of a reference phase.

<Second Load Variation Detection Method>

Hereinafter, the above-described second load variation detection method will be described.

Figure 8:
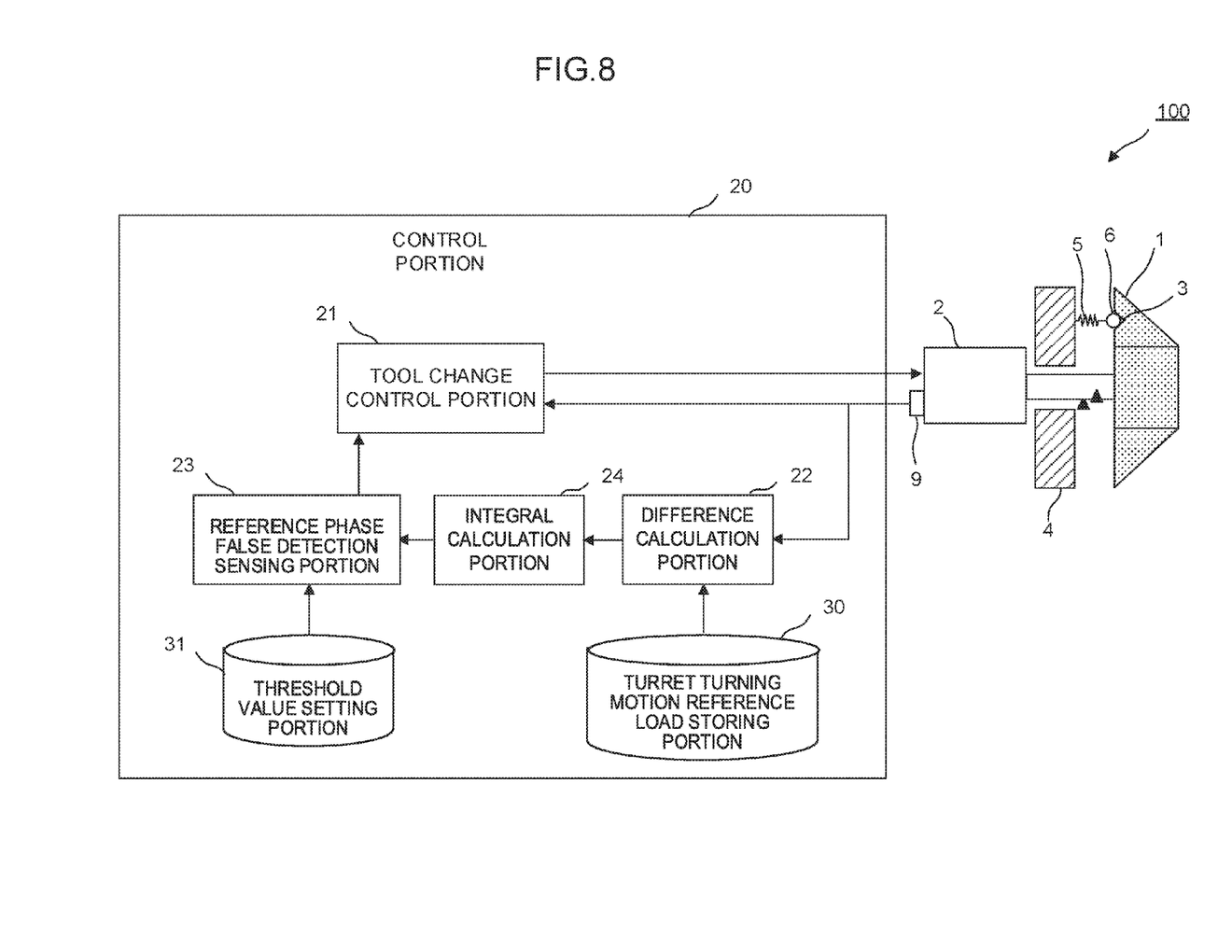
FIG. 8 is a schematic block diagram depicting a function of the control portion of the tool changer in accordance with a second load variation detection method of the present invention.

FIG. 8 is a schematic block diagram depicting a function of the control portion of the tool changer according to one embodiment of the present invention. Driving of the turret drive source 2 of the tool changer 100 of the present embodiment is controlled by the control portion 20. Moreover, in addition to the tool change control portion 21, the difference calculation portion 22, the reference phase false detection sensing portion 23, the turret turning motion reference load storing portion 30, and the threshold value setting portion 31, the control portion 20 further includes an integral calculation portion 24. Incidentally, the operations of the functional units other than the integral calculation portion 24 and the reference phase false detection sensing portion 23 are the same as the operations described in FIG. 3.

The integral calculation portion 24 calculates the integral of the absolute value of a difference between the load of the turret drive source 2 detected by the load detecting portion 9 and the reference load after the start of the turning motion of the turret 1, the difference calculated by the difference calculation portion 22.

The reference phase false detection sensing portion 23 of the present embodiment receives the integral of the absolute value of the difference between the load of the turret drive source 2 detected by the load detecting portion 9 and the reference load, the integral output from the integral calculation portion 24, and compares, in each phase, the integral with a threshold value $Th_i$ which is set in the threshold value setting portion 31. Then, if the integral has exceeded the threshold value $Th_i$ in any phase, the reference phase false detection sensing portion 23 determines that there is a possibility that wear of the turret mechanism portion is progressing and issues, to the tool change control portion 21, a command not to correct or adjust the reference phase and a command to stop the tool change control. At this time, the reference phase false detection sensing portion 23 may inform the operator of the possibility of the progress of wear of the turret mechanism portion by providing a notification to that effect to an unillustrated display device or alarm device.

Figure 9A:
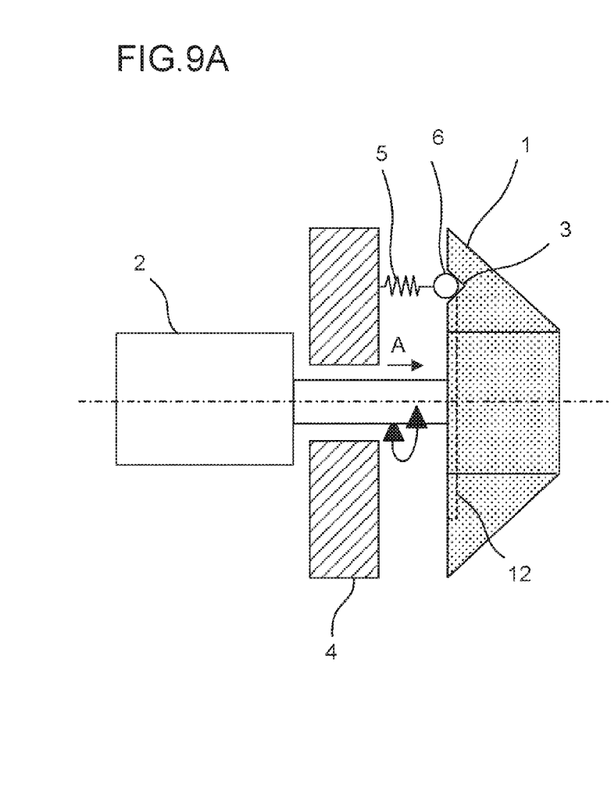
FIG. 9A is a diagram explaining the second load variation detection method.
Figure 9B:
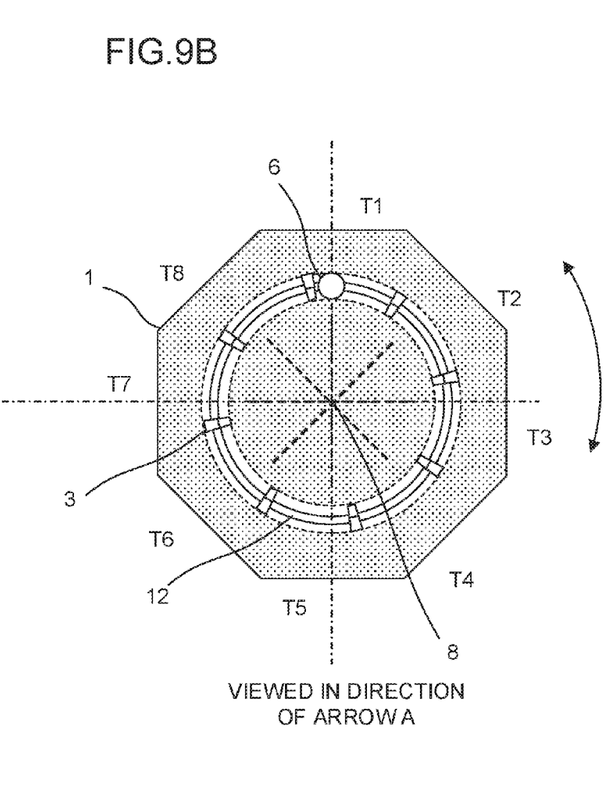
FIG. 9B is a diagram of the turret viewed from the side of the turret drive source in the direction of an arrow A.

FIGS. 9A and 9B depict an example of a state in which the turret indexing mechanism part is worn away. The turret 1 and the ball 6 rub against each other as a result of the turret 1 repeatedly turning, wear progresses, and a groove 12 caused by the progress of wear around the center 8 of turning of the turret 1 appears.

Figure 10A:
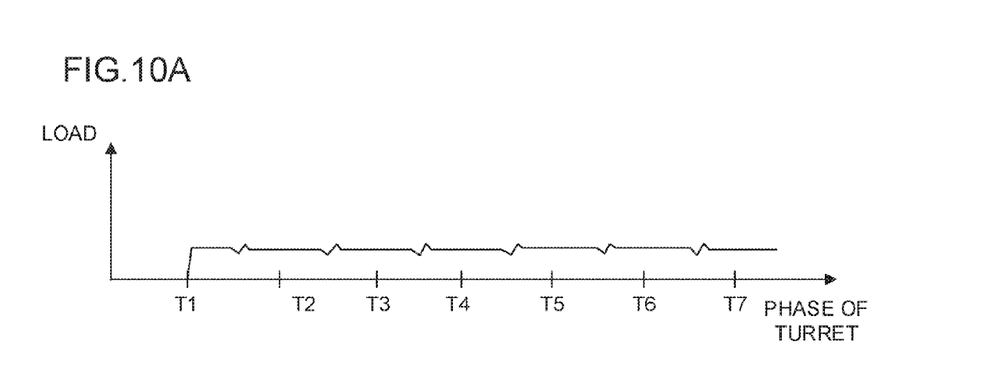
FIG. 10A is a diagram depicting variations in the load which occur in the turret drive source and the integral of the absolute value of a difference in the load in the second load variation detection method (in a state in which the turret is worn away)

FIG. 10A depicts load variations of the turret drive source 2 which are detected in the state of FIGS. 9A and 9B. When the turret 1 turns and the ball 6 moves in an area of the turret 1 surrounded by dotted lines between two circumferences, of which one is smaller or larger than the other, while pressing the turret 1, if there is the groove 12 caused by the progress of wear, since the spring 5 is in a stretched state as compared to the state in which no wear occurs, the frictional force generated by the ball 6 is reduced. Moreover, since the amount of change by which the spring 5 stretches and compresses when the ball 6 passes through the groove 3 becomes smaller than the amount of change which is observed before the occurrence of wear, the amount of change in variations to be detected also becomes smaller. This makes it impossible to detect the reference phase based on the variations.

Figure 10B:
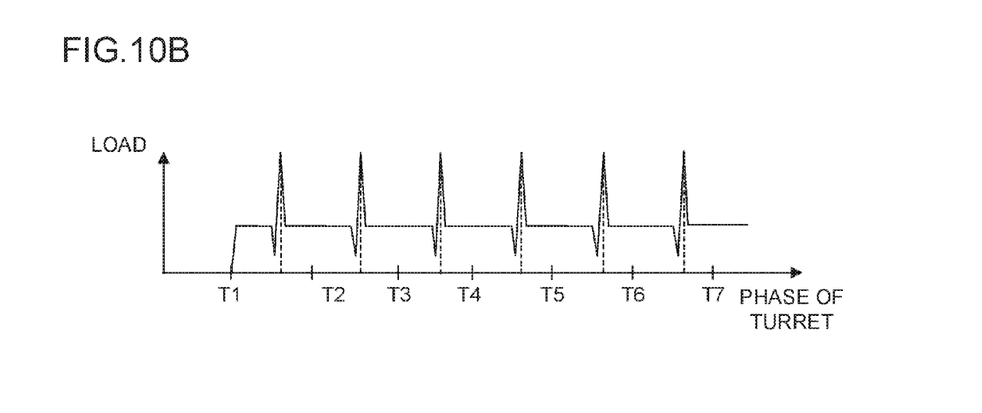
FIG. 10B is a diagram depicting variations in the load which occur in the turret drive source and the integral of the absolute value of a difference in the load in the second load variation detection method (in a normal state in which the turret is not worn away)
Figure 10C:
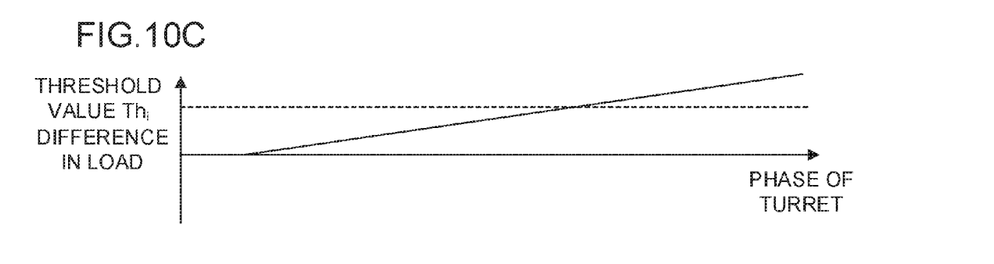
FIG. 10C is a diagram depicting the relationship among variations in the load which occur in the turret drive source, the difference value of the load, and a threshold value $Th_t$ in the second load variation detection method.

FIG. 10B depicts load variations of the turret drive source 2 in normal times. Moreover, FIG. 10C depicts how the integral of the absolute value of a difference, which is calculated by the difference calculation portion 22, between the load of the turret drive source 2 detected by the load detecting portion 9 and the reference load varies, the integral evaluated by the integral calculation portion 24. By sensing that the integral has exceeded the threshold value $Th_i$ for the variations in the integral of the absolute value of the difference as depicted in FIG. 10C, it is possible to sense the wear progressing in the turret mechanism portion and prevent false detection of a reference phase.

Figure 11:
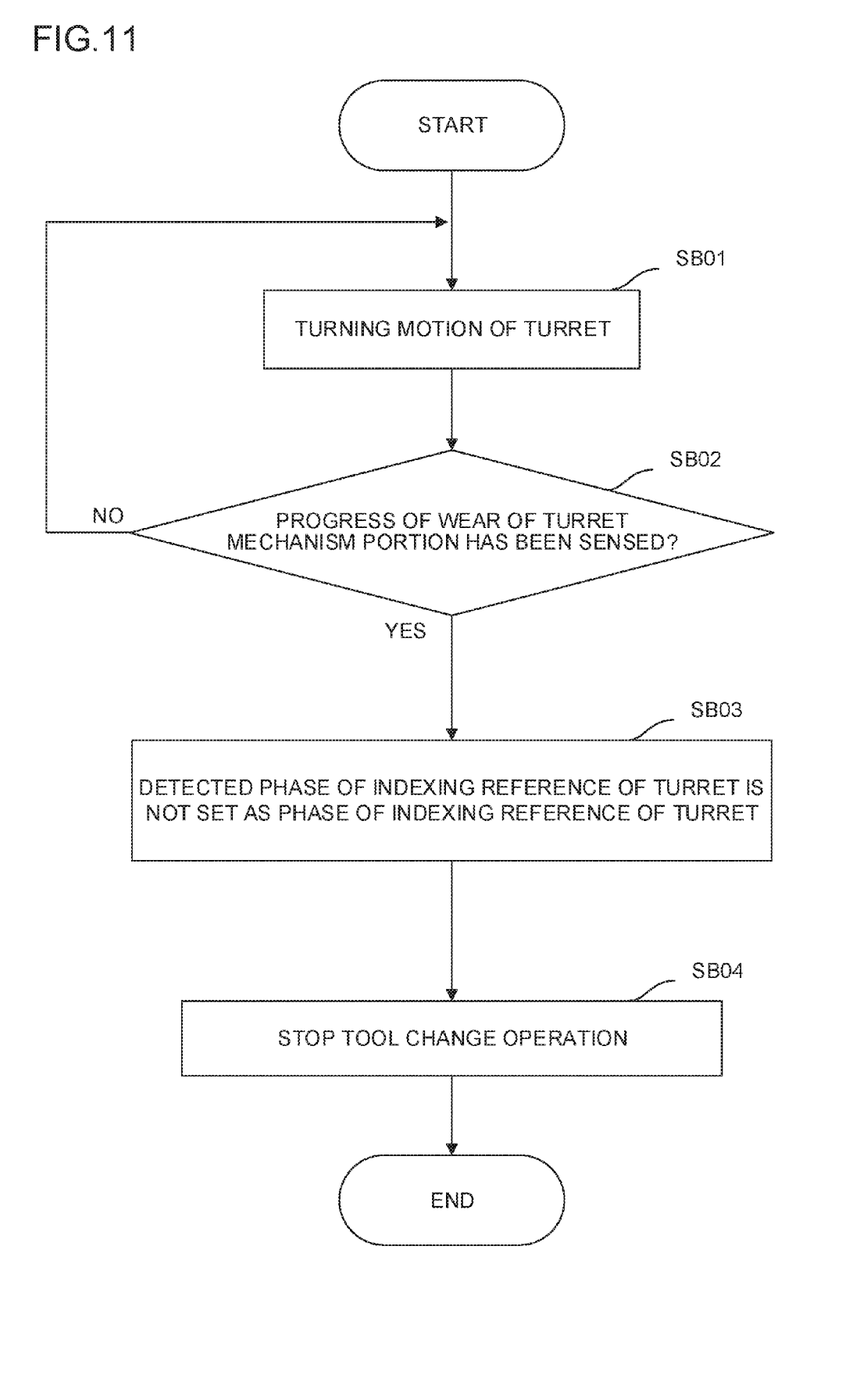
FIG. 11 is a flowchart of the second load variation detection method which is carried out in the control portion of the tool changer of FIG. 8.

FIG. 11 is a flowchart of tool change control processing according to the present embodiment.

[Step SB01] The tool change control portion 21 performs control of turning motion of the turret 1 based on a command.

[Step SB02] The reference phase false detection sensing portion 23 determines whether or not the reference phase false detection sensing portion 23 has sensed wear progressing in the turret mechanism portion based on the integral of the absolute value of a difference between the load at the time of turning and the reference load, the integral evaluated by the integral calculation portion 24. If the reference phase false detection sensing portion 23 has sensed wear progressing in the turret mechanism portion, the procedure proceeds to Step SB03; if the reference phase false detection sensing portion 23 has not sensed wear progressing in the turret mechanism portion, the procedure goes back to Step SB01.

[Step SB03] The reference phase false detection sensing portion 23 issues, to the tool change control portion 21, a command not to set the detected indexing reference phase of the turret 1 as the phase of the indexing reference of the turret 1.

[Step SB04] The tool change control portion 21 performs control to stop the tool change operation.

As described above, when wear of the turret mechanism part progresses, the way the load varies at the time of tool change changes, which sometimes makes it impossible to detect the reference phase based on the variations. However, with the above-described configuration, by evaluating the integral of the difference value and sensing that the integral has exceeded the threshold value set for the integral, it is possible to sense that wear of the turret mechanism part is progressing and, by not setting the reference phase based on the variations detected after the above sensing and stopping the tool change operation, it is possible to prevent false detection of a reference phase.

Although the embodiment of the present invention has been described above, the present invention is not limited to the example of the above-described embodiment and can be carried out in various modes by making appropriate changes or modifications thereto.

For instance, the way the grooves 3, which are provided on the circular path of the turret 1 in the above-described embodiment, are formed is a mere example, and the grooves 3 do not necessarily have to be formed on the circumference of a circle at regular intervals; the grooves 3 may be formed at irregular intervals. Moreover, in the above-described embodiment, the grooves 3 are assumed to have the same depth and shape, but the grooves 3 may have different depths and shapes and, for example, the number of grooves 3 may be changed. By so doing, it also becomes possible to detect each of a plurality phases in which a tool can be transferred, such that one of the phases is distinguished from the other. Furthermore, in order to make the coefficient of friction of a part of the groove 3 different from the coefficient of friction of the other parts, by changing the roughness of the surface of the part of the groove 3, using, for the part of the groove 3, a material different from the material of the other parts, or using, for the part of the groove 3, a surface treatment different from the surface treatment for the other parts, it is possible to change the way the load which is applied to the turret drive source 2 varies.

Moreover, it is also possible to vary the load of the turret drive source 2 by providing mountain-shaped protrusions in place of the grooves 3. Furthermore, by using a roller in place of the ball 6 or adopting a method of, for example, pressing a cantilever with a supported end on the side of the fixed portion 4 against a part on concentric circles instead of using the spring 5 and the ball 6, it is also possible to vary the load of the turret drive source 2.

In addition, the above-described first load variation detection method and second load variation detection method may be carried out concurrently in the control portion. In that case, both the threshold value $Th_d$ and the threshold value $Th_i$ are set and stored in the threshold value setting portion 31 in advance, and, by comparing the difference value output from the difference calculation portion 22 with the threshold value $Th_d$ and comparing the integral evaluated by the integral calculation portion 24 with the threshold value $Th_i$, the reference phase false detection sensing portion 23 can detect both an entry of a foreign substance into the turret mechanism portion and wear of the turret mechanism part.

Although the embodiment of the present invention has been described above, the present invention is not limited to the example of the above-described embodiment and can be carried out in other modes by making appropriate changes or modifications thereto.

The invention claimed is:

1. A tool changer of a machine tool, the tool changer comprising: a rotationally indexable turret that is rotatable about an axis;

a turret drive source configured to perform tool indexing by rotating the turret about the axis;

a load variation mechanism configured to vary a load of the turret drive source as the turret is rotated about the axis past a predetermined angular phase position;

a load detecting portion configured to detect the load of the turret drive source as the turret is rotated about the axis, which load is varied by the load variation mechanism; and a control portion, the control portion comprising:

a turret turning motion reference load storing portion configured to store, as stored reference load information, the load of the turret drive source as the turret is rotated about the axis in a state in which no difference is caused between: (i) a controller-recognized angular position of the turret about the axis, recognized by a controller of the machine tool, and (ii) an actual angular position of the turret about the axis;

a difference calculation portion that calculates a difference between the stored reference load information and a load of the turret drive source detected by the load detecting portion as the turret is rotated about the axis in a state in which a difference exists between: (i) a controller-recognized angular position of the turret about the axis, recognized by the controller of the machine tool, and (ii) an actual angular position of the turret about the axis;

a threshold value setting portion configured to set a threshold value; and     a reference phase false detection sensing portion configured to determine a possibility of false detection of the predetermined angular phase position if the difference calculated by the difference calculation portion has exceeded the threshold value.

2. A tool changer of a machine tool, the tool changer comprising:

a rotationally indexable turret that is rotatable about an axis;

a turret drive source configured to perform tool indexing by rotating the turret about the axis;

a load variation mechanism configured to vary a load of the turret drive source as the turret is rotated about the axis past a predetermined angular phase position;

a load detecting portion configured to detect the load of the turret drive source as the turret is rotated about the axis, which load is varied by the load variation mechanism; and a control portion, the control portion comprising:

a turret turning motion reference load storing portion configured to store, as stored reference load information, the load of the turret drive source as the turret is rotated about the axis in a state in which no difference is caused between: (i) a controller-recognized angular position of the turret about the axis, recognized by a controller of the machine tool, and (ii) an actual angular position of the turret about the axis;

a difference calculation portion configured to calculate a difference between the stored reference load information and a load of the turret drive source detected by the load detecting portion as the turret is rotated about the axis in a state in which a difference exists between: (i) a controller-recognized angular position of the turret about the axis, recognized by the controller of the machine tool, and (ii) an actual angular position of the turret about the axis;

an integral-of-difference calculation portion configured to evaluate an integral of a value of the difference;

a threshold value setting portion configured to set a threshold value; and     a reference phase false detection sensing portion configured to determine a possibility of false detection of the predetermined angular phase position if the integral evaluated by the integral-of-difference calculation portion has exceeded the threshold value.

\* \* \* \* \*